(No Model.)

W. W. SNOW.
SWITCH STAND.

No. 507,245. Patented Oct. 24, 1893.

ATTEST:
W. Colborne Brookes
George H. Rehback.

INVENTOR:
William W. Snow
by Wyllys Hodges Atty

UNITED STATES PATENT OFFICE.

WILLIAM W. SNOW, OF RAMAPO, NEW YORK.

SWITCH-STAND.

SPECIFICATION forming part of Letters Patent No. 507,245, dated October 24, 1893.

Application filed April 4, 1883. Serial No. 90,541. (No model.)

*To all whom it may concern:*

Be it known that I, WILLIAM W. SNOW, of Ramapo, Rockland county, in the State of New York, have invented certain new and useful Improvements in Switch-Stands, of which the following is a specification, to be more fully understood by reference to the accompanying drawings, in which—

Figure 1:
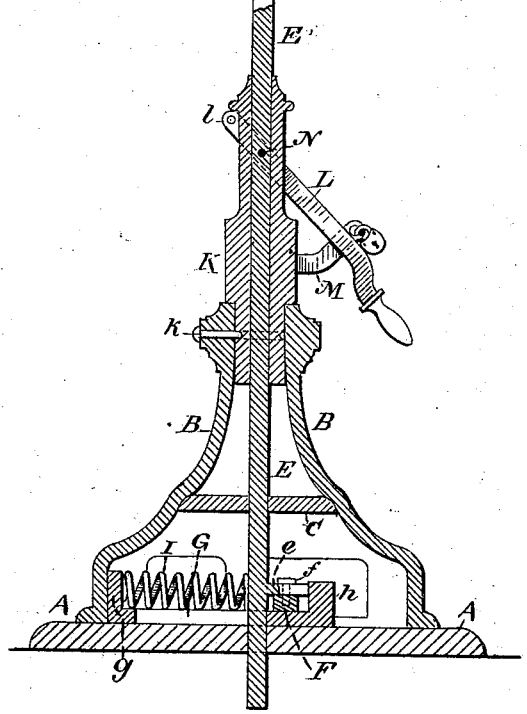
Figure 2:
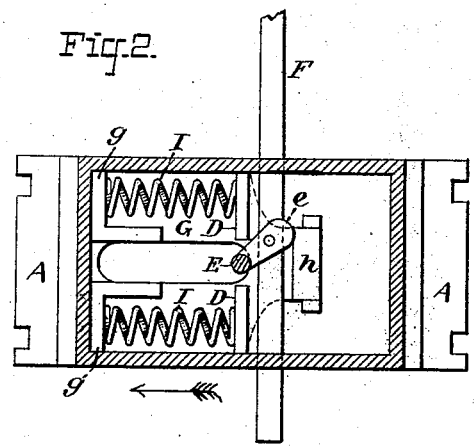

Figure 1, shows a vertical section through the center of the stand, and Fig. 2, shows a horizontal section of the base of the switch just above, and illustrating the moving parts.

The invention relates to that class of switch stands which when locked so as not to be operated by manual power yet present only a measured resistance to motion capable of being overcome by the power of the wheels upon the rails when exerted in certain directions, whereby the switch though locked is capable of certain automatic motions to prevent accidents.

The fixed portions of the stand are the base plate A A and the conical or molded stand B B properly secured to the base plate A. To the stand B are also attached the bridge C and the abutments D D, either cast with, or rigidly attached to, it in any convenient manner.

The movable parts of the stand are as follows: The crank shaft E revolving and capable of a vertical or longitudinal movement in its bearings in the base plate A and bridge C and having cast upon or rigidly secured to it a crank arm $e$.

F is the moving rod attached to the moving rails or points and pivoted to the crank arm $e$ by the crank pin $f$ which also secures it so that it will have a vertical motion with the crank arm $e$ as the latter is moved up and down by the shaft E. Under the rod F and abutments D slides the plate G upon the base plate A. It is slotted to permit the shaft E to pass through it without interfering with its motion and bears upon its inner end the abutments $g$ between which and the abutments D are the expanding springs I I tending therefore, to move the plate G in the direction of the arrow. Upon the other end of the plate is the nose $h$ projecting upward from the plate and having its inner surface bearing upon the crank arm $e$ and interfering with the motion of the latter by the power of the springs. The inner edge of this nose against which the crank arm bears is shown straight in the drawings but it may be slightly curved or convexed to facilitate the cam action of the crank upon the plate. It will be easily understood that by an inverse arrangement of the springs this plate might be placed entirely upon the right of the crank and moving rod the crank arm bearing upon the outer edge of the nose $h$. The upper end of the shaft E passes through a rotating block or bearing K which is swiveled in the upper end of the stand B by means of the bolt $k$ engaging a recess in K or other suitable contrivance in such a manner that it has a rotary motion with the shaft E but no vertical motion and does not interfere with the vertical motion of the shaft. To lugs $l$, upon it, is pivoted the forked lever L surrounding the shaft and swivel block K and having a vertical motion upon its pivot. The lever is also slotted vertically so that when depressed the arm M can pass through the slot and the lever be secured from a vertical motion by a padlock or hasp, the arm M being a part of the swivel block K. A bolt N passes through the forks of the lever, vertical slots in the swivel block K and a hole in the shaft E so that when the lever is raised it will raise the shaft; and the lever, shaft, swivel block and locking arm rotate together. The latter is therefore always in position to receive the lever. The shaft E carries upon its upper end any proper semaphore.

The operation of the stand is as follows: As shown in the drawings it is locked because the crank arm and shaft are restrained from rotating by the plate G and the nose $h$. Should however a train pass having a tendency to move the switch in the desired automatic way the rod F would force the crank $e$ to move the plate G by its action upon the nose $h$, compressing the spring. The crank would pass to the other side of the nose and be there locked as before. The crank of course carries with it the shaft E, swivel block K, arm M and lever L, and the semaphore showing the changed positions of the switch.

The whole is now capable of operating in the opposite direction by the reverse action of the rails.

The lever L, is so proportioned with reference to the arm N and the spring I that when depressed it will not have sufficient power upon the shaft E to rotate it against the power of the spring. In this manner I secure the locking of the switch against any accidental motion there being no portion of it capable of overcoming the power of the spring, when the lever is depressed without the application of such a power as the action of the car wheels upon the rails. When it is desired to shift the switch, the lever is raised, rotated and depressed completing the operation of unlocking, shifting and relocking. The raising of the lever raises the shaft E and crank arm $e$ completely freeing the latter from the nose $h$ of the plate G. The rotating lever then moves the shaft, crank arm, moving rod and rails freely, and by its depression again blocks the crank arm by means of the nose $h$. To prevent any catching of the arm upon the upper edge of the nose, the latter might be slightly beveled but with a proper construction of the parts this would be unnecessary.

Instead of the locking plate G acting directly upon the crank arm $e$ it might, if it were thought desirable to locate it at another part of the shaft, be made to operate upon another cam attached to the shaft. The cam which is blocked by the plate should however be so attached to the shaft as to rotate continuously with it, the one being incapable of rotary motion without the other.

What I claim is—

1. The combination of the moving rod F. crank shaft E. and yielding locking plate G. acting directly upon the crank arm $e$. or other cam so attached to the shaft as to rotate with it substantially as described.

2. The swivel block K. having a rotary motion only in combination with the lever L. pivoted to it, the locking arm M. moving with it, and the vertically moving crank shaft E. substantially as described.

3. The combination of the standard the spindle and switch operating rod, with the spring locking plate G. and crank or cam $e$, or its equivalent, having cam faces whereby the completion of the movement of the switch, is aided by the force of the spring and means for ungearing the switch operating rod with the locking plate substantially as described.

WILLIAM W. SNOW.

Witnesses:
R. J. DAVIDSON,
G. BURGERT.